(12) United States Patent
Yagi

(10) Patent No.: US 11,716,979 B2
(45) Date of Patent: Aug. 8, 2023

(54) FISHING LURE

(71) Applicant: GLOBERIDE, Inc., Tokyo (JP)

(72) Inventor: Hiroshi Yagi, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 139 days.

(21) Appl. No.: 17/190,469

(22) Filed: Mar. 3, 2021

(65) Prior Publication Data

US 2021/0274763 A1    Sep. 9, 2021

(30) Foreign Application Priority Data

Mar. 6, 2020 (JP) ................................. 2020-038756

(51) Int. Cl.
*A01K 85/16* (2006.01)
*A01K 85/01* (2006.01)

(52) U.S. Cl.
CPC .............. *A01K 85/16* (2013.01); *A01K 85/01* (2013.01)

(58) Field of Classification Search
CPC ........ A01K 85/16; A01K 85/01; A01K 85/12; A01K 85/00; A01K 85/10
USPC ............................................................. 43/42
See application file for complete search history.

(56) References Cited

U.S. PATENT DOCUMENTS

| | | | | |
|---|---|---|---|---|
| 1,852,620 A * | 5/1930 | Martin | .................... | A01K 85/14 |
| 2,190,791 A * | 2/1940 | Larson | .................... | A01K 85/01 |
| | | | | 362/253 |
| 2,750,701 A * | 6/1956 | Beames | .................. | A01K 85/16 |
| | | | | 43/42.47 |
| 2,909,863 A * | 10/1959 | Rector | ................... | A01K 85/01 |
| | | | | 43/42.49 |
| 3,969,839 A * | 7/1976 | Ziegler | .................. | A01K 85/01 |
| | | | | 43/17.6 |
| 4,250,651 A * | 2/1981 | Ramme | .................. | A01K 85/01 |
| | | | | 43/42.35 |
| 4,380,132 A * | 4/1983 | Atkinson | ............... | A01K 85/01 |
| | | | | 43/42.31 |
| 5,084,996 A | 2/1992 | Woodruff et al. | | |
| 6,029,388 A * | 2/2000 | Yokogawa | ............. | A01K 85/01 |
| | | | | 43/17.5 |
| 6,671,996 B1 * | 1/2004 | Ito | .......................... | A01K 85/16 |
| | | | | 43/42.31 |

(Continued)

FOREIGN PATENT DOCUMENTS

CN    110384078 A    10/2019
JP    H11-75628    3/1999

(Continued)

OTHER PUBLICATIONS

Chinese Office Action for related Chinese Application No. 20210244846. X; action dated Jun. 30, 2022; (19 pages).

(Continued)

*Primary Examiner* — Philip J Bonzell
*Assistant Examiner* — Maria E Graber
(74) *Attorney, Agent, or Firm* — K&L Gates LLP

(57) ABSTRACT

A fishing lure includes a main body portion with a cavity provided inside of the main body portion; a plurality of elastic members with end portions attached to the main body portion; a swing member that swings and is attached to the elastic members and swings, wherein the swing member is visible from the outside of the main body portion and at least two points of the swing members are supported by the elastic members.

10 Claims, 10 Drawing Sheets

(56) References Cited

U.S. PATENT DOCUMENTS

| | | | | |
|---|---|---|---|---|
| 8,402,688 | B2* | 3/2013 | Choi | A01K 85/01 43/42.31 |
| 9,271,482 | B2* | 3/2016 | Hamaguchi | A01K 85/01 |
| 9,661,832 | B2* | 5/2017 | Scharlé | A01K 85/16 |
| 11,000,022 | B2* | 5/2021 | Choi | A01K 85/16 |
| 11,439,133 | B2* | 9/2022 | Nakamichi | A01K 85/01 |
| 2005/0034349 | A1* | 2/2005 | Dugger. II | A01K 85/01 43/17.1 |
| 2015/0264902 | A1* | 9/2015 | Scharle | A01K 85/01 43/42.31 |
| 2016/0309687 | A1* | 10/2016 | Ito | A01K 85/00 |
| 2019/0320634 | A1 | 10/2019 | Kawasaki et al. | |
| 2021/0386043 | A1* | 12/2021 | Yamane | A01K 85/16 |

FOREIGN PATENT DOCUMENTS

| | | |
|---|---|---|
| JP | 2003219765 A | 8/2003 |
| JP | 2015173645 A | 10/2015 |
| JP | 2019187246 A | 10/2019 |
| JP | 2021061795 A | 4/2021 |

OTHER PUBLICATIONS

Second Australian Examination Report for related Australian Application No. 2021201439; report dated Aug. 5, 2022; (4 pages).

Australian Examination Report for related Australian Application No. 2021201439; report dated Feb. 1, 2022; (9 pages).

Third Party Submission of Publications in related Japanese Application No. 2020-38756; dated Oct. 20, 2021 (21 pages).

Shimano, Inc.; "Lure X 2019 Spring & Summer", Jan. 15, 2019, pp. 5, 6, 10 and 39.

Shimano, Inc.; "Lure X 2019 Autumn & Winter", Aug. 1, 2019, pp. 3-6 and 10.

Shimano, Inc.; "2020 Shimano Fishing Tackle Catalog", Jan. 10, 2020, pp. 321.

Chinese Office Action for related Chinese Application No. 202110244846.X; action dated Jun. 30, 2022; (19 pages).

Office Action for related Japanese Application No. 2020-038756; action dated Jan. 10, 2023; 10 pages).

Office Action in connection with related Korean Patent Application No. 10-2021-0015109; action dated Feb. 16, 2023; (8 pages).

* cited by examiner

FISHING LURE

TECHNICAL FIELD

This disclosure relates to a fishing lure.

BACKGROUND

Conventionally, an artificial bait (lure) replicating bait such as a small fish has been used in lure fishing for catching fish eaters. Various types of such a lure have been known including a bait log, spoon, plug, spinner, jig, plastic lure and the like.

As one such lure, JP-A-Hei 11-75628 relates to a fish lure such as an artificial bait used for fishing. Particularly, the fish lure includes a main body in which a light beam reflecting object is sealed together with liquid. The movement of the reflecting object leads to complex reflected light, producing better catches.

The fish lure as disclosed in JP-A-Hei 11-75628 has the light reflecting small piece sealed together with liquid, and the reflected light is obtained through the movement of the reflecting body. Unfortunately, the small piece can only move sluggishly, and thus is difficult to reliably provide a fish luring effect.

It could therefore be helpful to provide a lure including a luring mechanism that can more reliably and sustainably provide the luring effect.

SUMMARY

I thus provide:

A fishing lure includes: a main body portion with a cavity provided inside of the main body portion; a plurality of elastic members having end portions attached to the main body portion; and a swing member that swings and is attached to the elastic members and swings, wherein the swing member is visible from outside of the main body portion, and at least two points of the swing members are supported by the elastic members.

The swing member may be provided with a weight.

The swing member may have an end portion configured to be provided with a weight.

A longitudinal direction of one of the elastic members may be orthogonal to a longitudinal direction of another one of the elastic members.

The swing member may comprise a plurality of swing portions coupled to each other by the elastic members, and the swing portions may be supported by the main body portion via the elastic members.

The elastic members may comprise spring members.

The swing member may have at least a portion formed to be in a V shape as viewed in a cross section orthogonal to an extending direction of the swing member.

The swing member may reflect light from the outside.

The swing member may have at least a portion formed to be in a circular shape, a polygonal shape, a corrugated shape, or a star shape as viewed in a cross section orthogonal to an extending direction of the swing member.

The at least a portion of the swing member may be formed to be a cylinder, a corrugated shape, a polygonal body, a polyhedral body, or a spherical body.

With various configurations, a lure including a luring mechanism that can more reliably provide the luring effect for a longer period of time can be provided.

Figure 1:
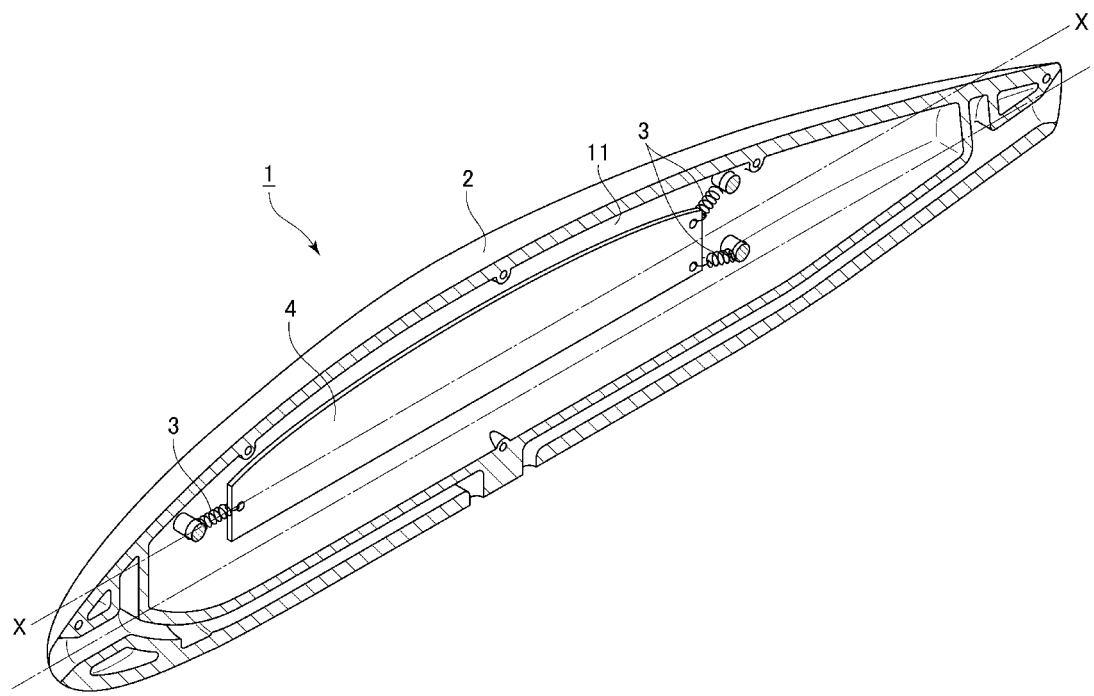
FIG. 1 is a schematic view of a fishing lure according to one example.

REFERENCE SIGNS LIST 1 lure
2 main body portion
3 elastic member
4 swing member
11 cavity
14 weight
A supporting position of elastic member
B position of weight
α distance between A and B

DETAILED DESCRIPTION

Various examples of my fishing lures will be described with reference to the drawings as appropriate. Like components in the drawings are denoted by like reference signs.

The fishing lure 1 according to one example will be described with reference to FIG. 1. As illustrated in FIG. 1, the fishing lure 1 includes: a main body portion 2 having an inner portion provided with a cavity; a plurality of elastic members 3 having end portions attached to the main body portion 2; and a swing member 4 that is attached to the elastic members 3 and swings. The swing member 4 is visible from the outside of the main body portion 2. At least two points (three in the example illustrated in FIG. 1) of the swing member 4 are supported by the elastic members 3. The swing member 4 is configured to reflect light from the outside. As the material of the swing member 4, a resin, a metal, or the like may be used but is not limited to these.

A lure including a luring mechanism can be provided that can more reliably provide a luring effect for a longer period of time. Furthermore, the swing member 4 is supported by the elastic members 3 attached to the main body portion so that even a light movement or vibration of the lure can be transmitted to the swing member 4 via the elastic member 3, whereby the swing member 4 can smoothly and continuously swing. Thus, light received from the outside by the swing member 4 can be reflected in various directions so that the reflected light reliably reaches the fish eater, whereby the luring effect can be dynamically improved.

Furthermore, with three points of the swing member 4 supported by the elastic members 3, the swing (swinging) of the swing member 4 can be controlled to be within an appropriate range to not be excessive. As a result, interference of the swing member 4 to the inner portion of the main body can be reduced. This configuration is further advantageous in that it leads to prevention of limitation of the swing (swinging) of the swing member 4 due to orientation or movement of the lure.

Figure 2:
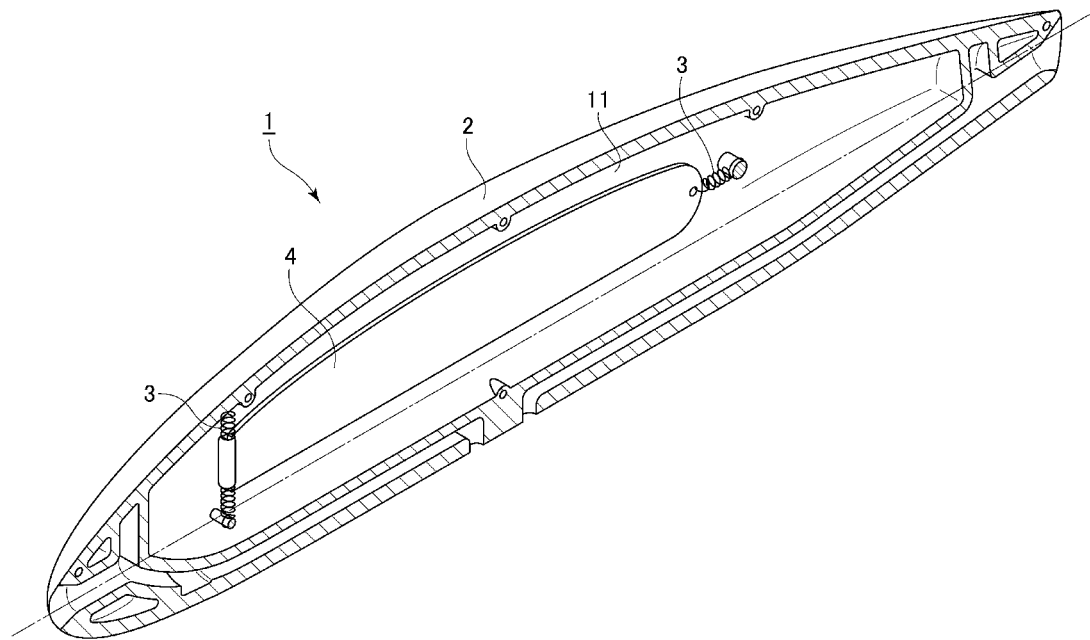
FIG. 2 is a diagram describing a swing mechanism for a fishing lure according to one example.

Next, the fishing lure 1 will be described with reference to FIG. 2. As illustrated in FIG. 2, in the fishing lure 1 according to one example, one of the two elastic members 3 is formed to have the longitudinal direction orthogonal to the longitudinal direction of the other one of the elastic members 3.

With the swing member 4 thus attached, a slight movement or vibration of the main body portion 2 results in vibration or twisting of the elastic members 3, and the resultant resilience force can make the swing member 4 more smoothly swing for a long period of time.

Thus, with the fishing lure 1, a lure including a luring mechanism can be provided that can more reliably provide luring effect for a long period of time.

Figure 3:
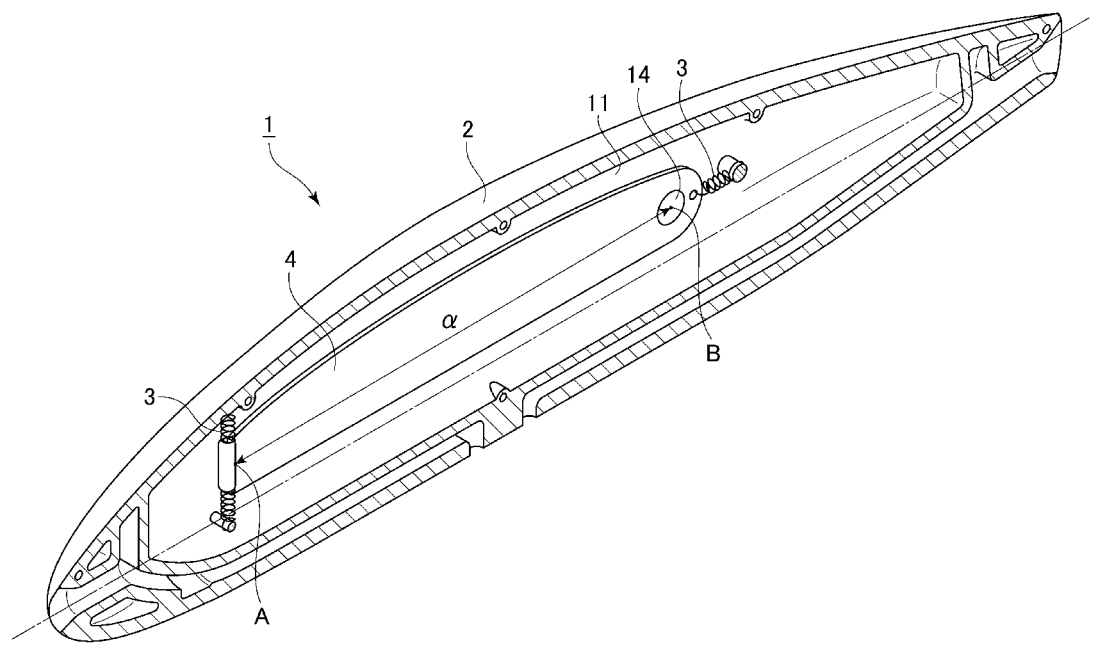
FIG. 3 is a diagram describing a swing mechanism for a fishing lure according to one example.

Next, the fishing lure 1 will be described with reference to FIG. 3. In the fishing lure 1 according to one example as illustrated in FIG. 3, one of the two elastic members 3 is formed to have the longitudinal direction orthogonal to the longitudinal direction of the other one of the elastic members 3 as in FIG. 2.

With the swing member 4 thus attached, a slight movement or vibration of the main body portion 2 results in vibration or twisting of the elastic members 3, and the resultant resilience force can make the swing member 4 more smoothly swing for a long period of time.

The fishing lure 1 is further configured to have a weight 14 provided to the swing member 4. In the illustrated example the swing member 4 is configured to have an end portion provided with the weight 14 but this should not be construed in a limiting sense. A longer distance a between a supporting position A of the elastic member 3 supporting the swing member 4 and a position B of the weight 14 can more facilitate the swing (swinging) of the swing member 4. For example, the weight 14 can be provided at any of forward, rear, upper and lower position. Thus, the manner and the magnitude of the swing (swinging) can be adjusted.

Thus, a lure including a luring mechanism can be provided that can more reliably provide a luring effect for a long period of time.

Figure 4:
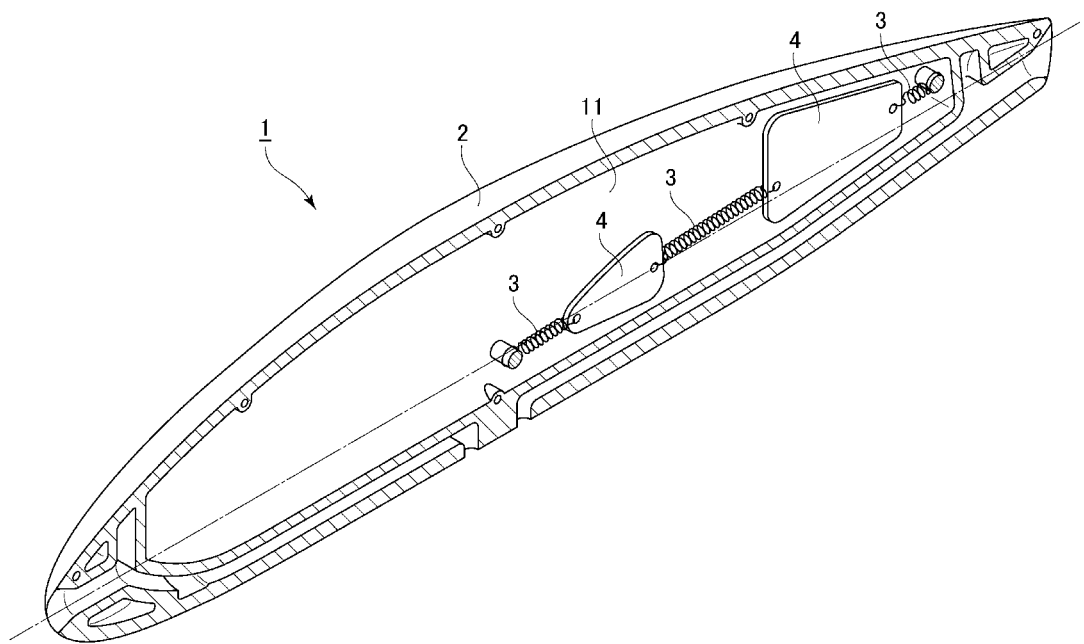
FIG. 4 is a diagram describing a swing mechanism for a fishing lure according to one example.

Next, the fishing lure 1 will be described with reference to FIG. 4. In the fishing lure 1 according to one example, a plurality of swing members 4 (two swing members 4 in the example illustrated in FIG. 4) are provided in the cavity 11 formed in the main body portion 2. The swing members 4 have one ends connected to one or a plurality of elastic members 3 (one elastic member 3 in the example illustrated in FIG. 4), and has the other ends attached to the main body portion 2 via one or a plurality of elastic members 3 (one elastic member 3 in the example illustrated in FIG. 4). The swing member may comprise a plurality of swing portions (three swing members, for example) that are coupled to each other via the elastic members, and the swing portions may be supported by the main body portion via the elastic members.

With the plurality of swing members 4 thus attached, a slight movement or vibration of the main body portion 2 results in the vibration and twisting of the plurality of elastic members 3. With the vibrations and the like amplified, a larger resilience force can make the swing member 4 more smoothly swing for a long period of time.

The elastic member 3 as described above may be a spring member or a (natural or synthetic) rubber, but is not limited to these.

Figure 5:
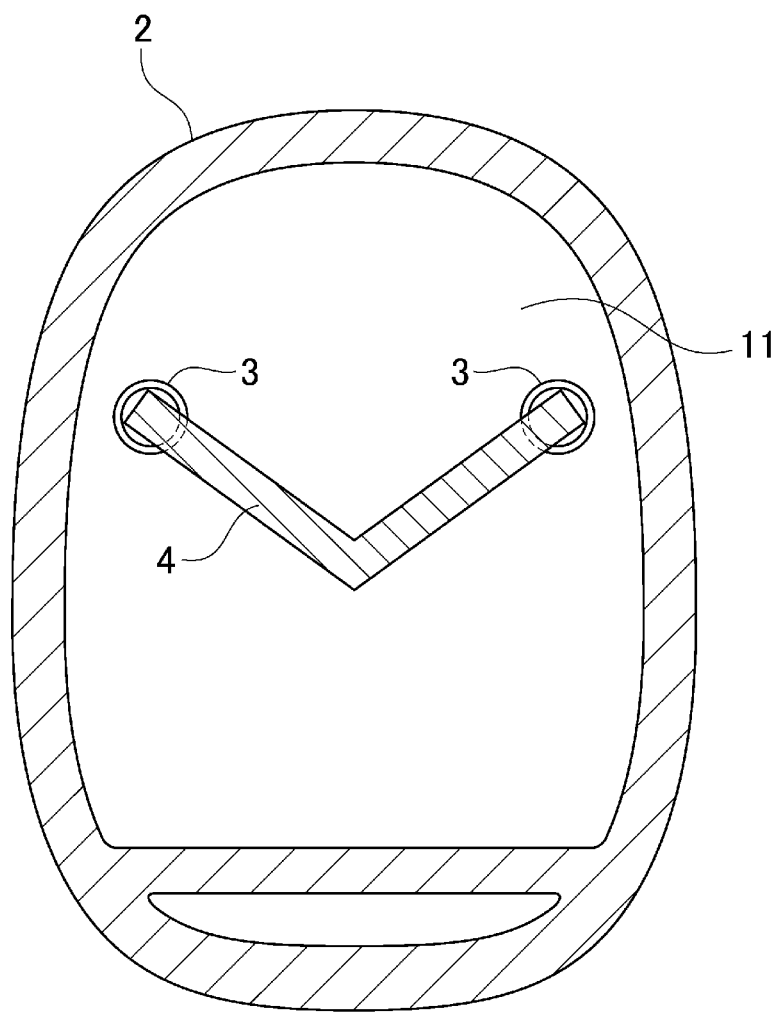
FIG. 5 is a sectional view of a swing member of a fishing lure according to one example.
Figure 6A:
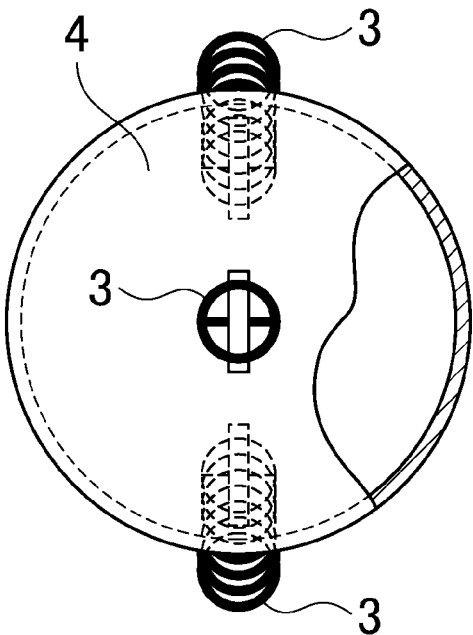
FIGS. 6A to 6D are sectional views of the swing member of a fishing lure according to examples of the present disclosure.
Figure 6B:
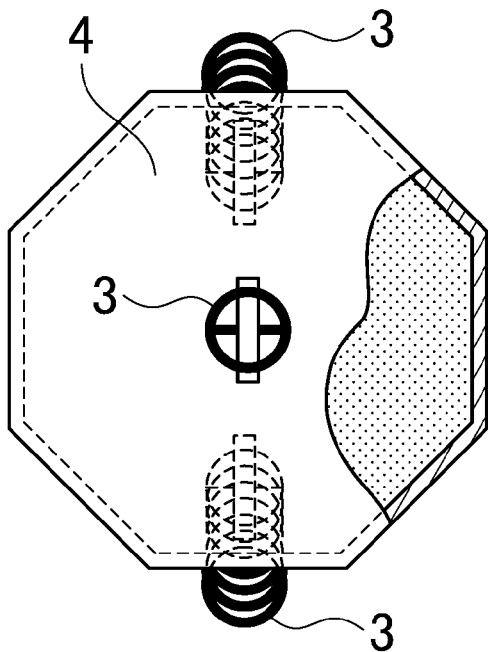
Figure 6C:
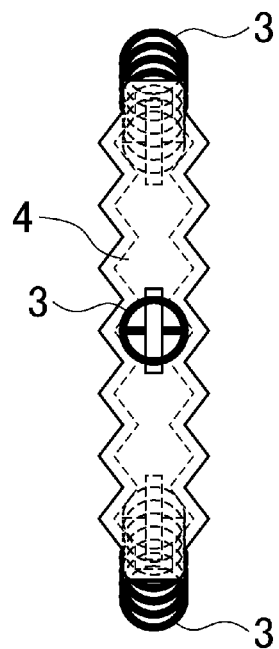
Figure 6D:
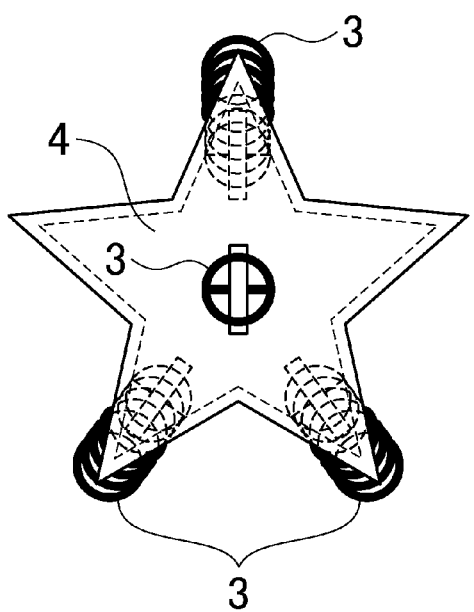

Next, the swing member 4 of the fishing lure 1 will be described with reference to FIG. 5. As illustrated in FIG. 5, the fishing lure 1 according to one example has the swing member 4 that is visible from the outside of the main body portion 2, and the swing member 4 has at least a portion formed to be in a V shape (example illustrated in FIG. 5) or U shape in a cross section orthogonal to an extending direction X (see FIG. 1) of the swing member 4.

Thus, the lure 1 can attract attention of fish looking it up from below, whereby a higher luring effect can be achieved.

Next, the swing member 4 of the fishing lure 1 will be described with reference to FIG. 6. As illustrated in FIG. 6, the fishing lure 1 according to one example includes the swing member 4 that is visible from the outside of the main body portion 2. At least a part of the swing member 4 is formed to be in a circular shape (FIG. 16A), a polygonal shape (FIG. 16B), a corrugated shape (FIG. 16C), or a star shape (FIG. 16D) in a cross-section orthogonal to the extending direction X (see FIG. 1) of the swing member 4.

With this configuration, the swing member 4 can rotate about the support member 3. Thus, the swing member 4 has a movable range limited while being prevented from colliding with an inner portion of the main body portion, whereby the cavity can have the smallest possible space. Furthermore, the light received by the swing member 4 from the outside can be reflected to various directions so that the reflected light reliably reaches the fish eater, whereby the luring effect can be dramatically increased.

Figure 7A:
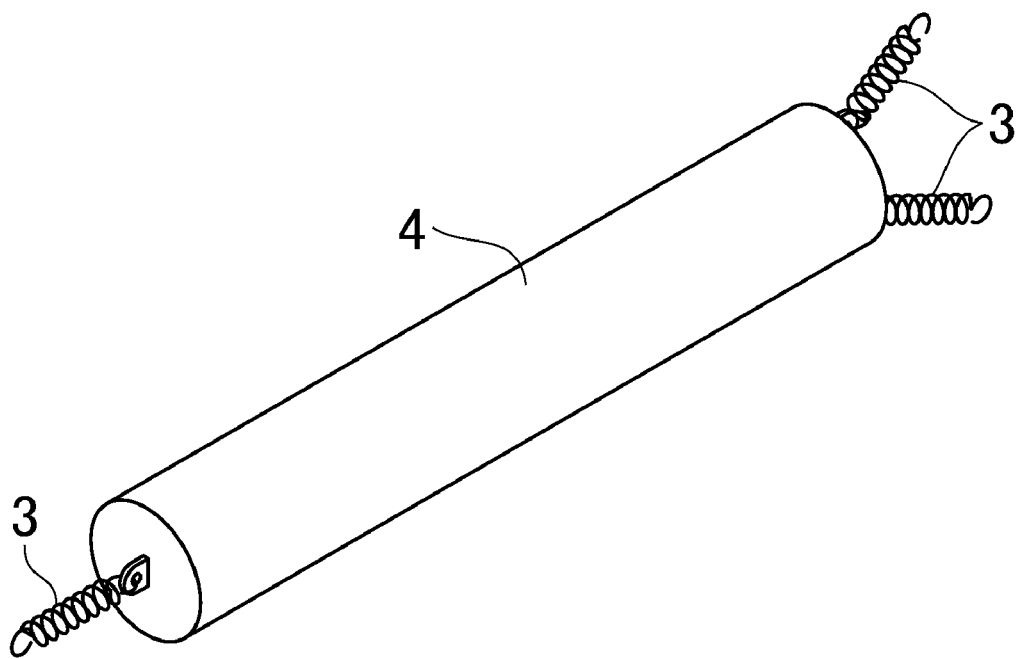
FIGS. 7A to 7G are perspective views of the swing member of a fishing lure according to examples of the present disclosure.
Figure 7B:
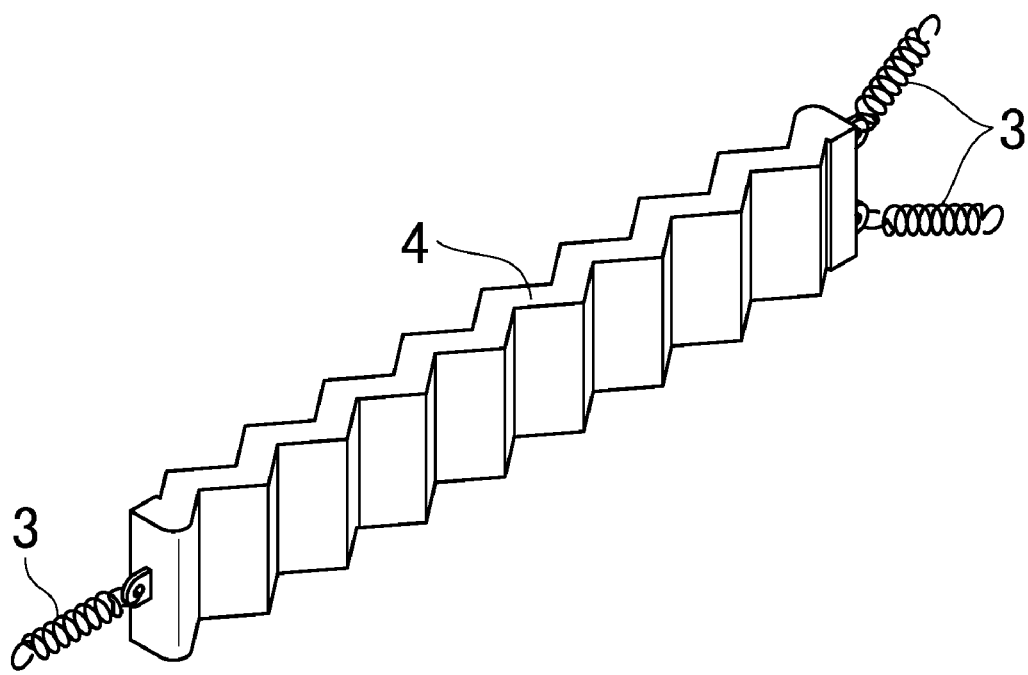
Figure 7C:
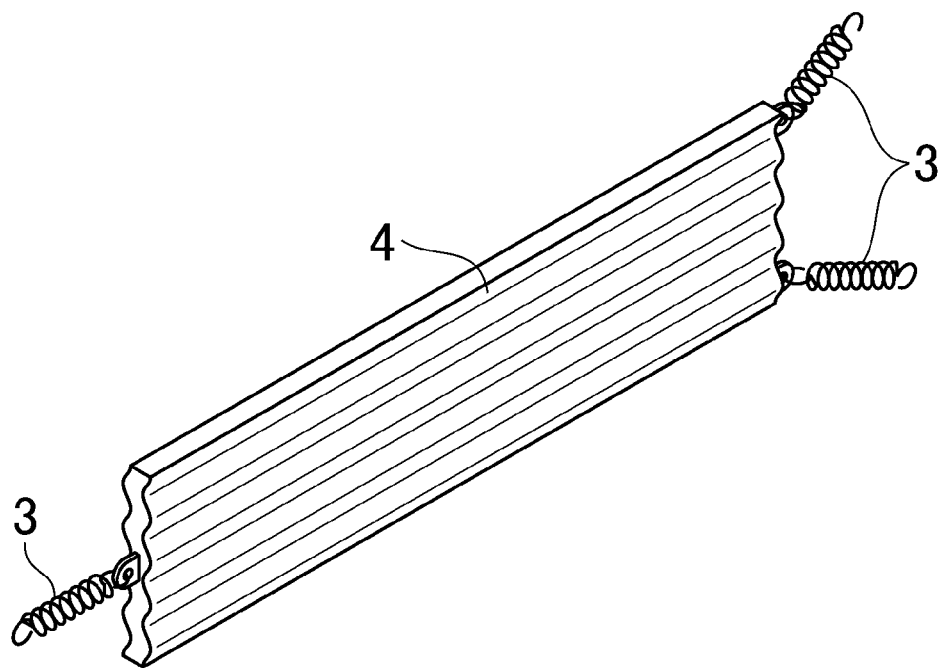
Figure 7D:
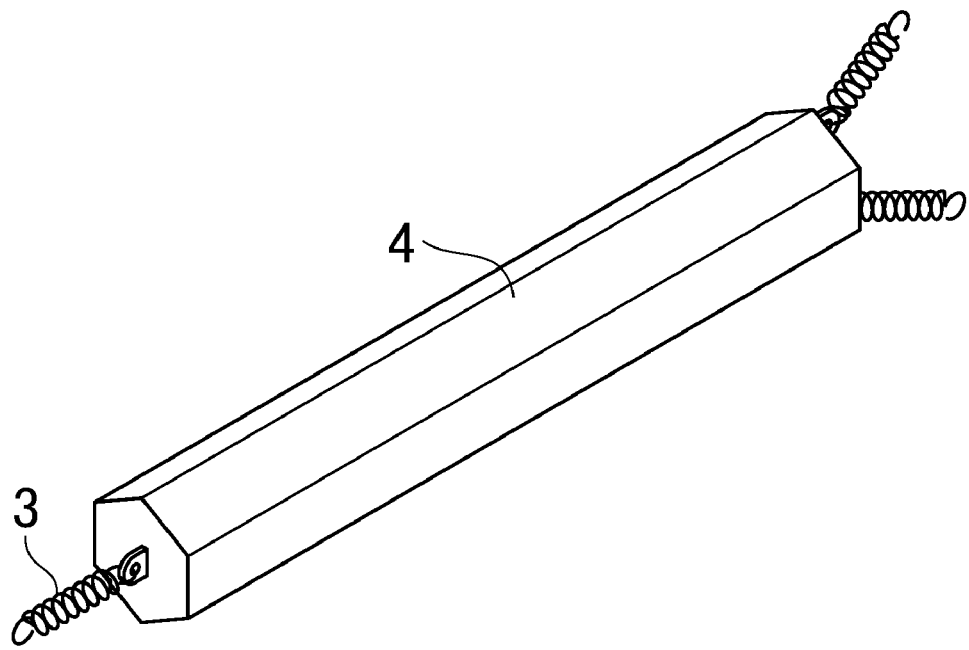
Figure 7E:
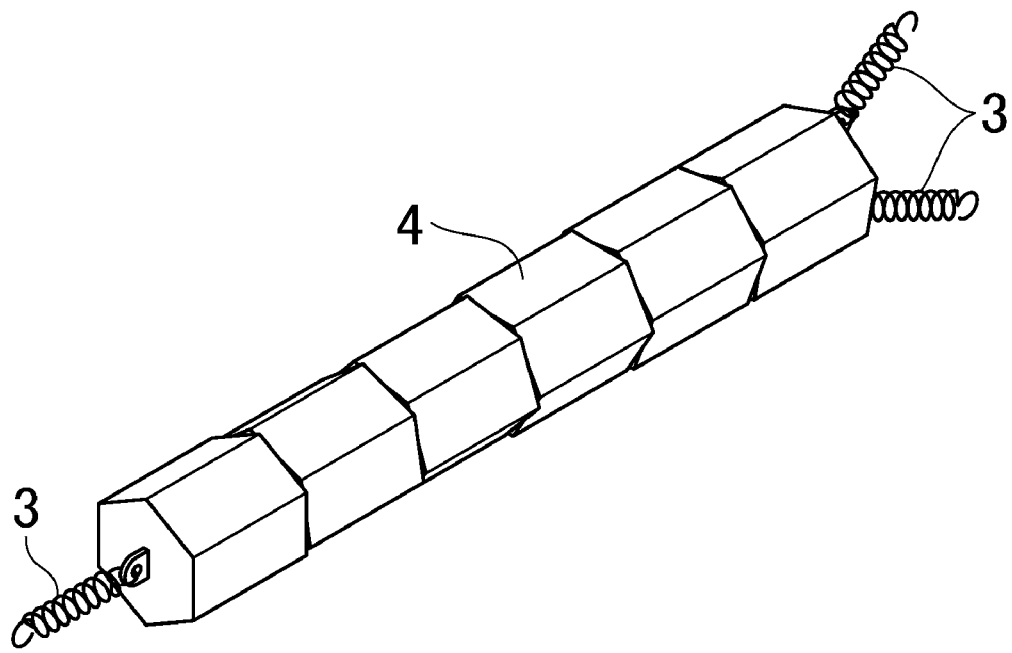
Figure 7F:
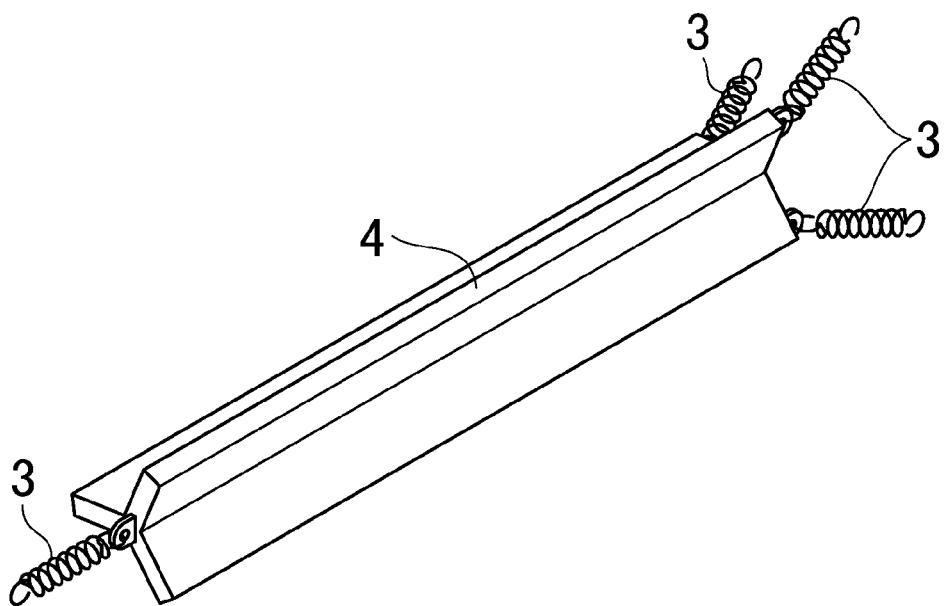
Figure 7G:
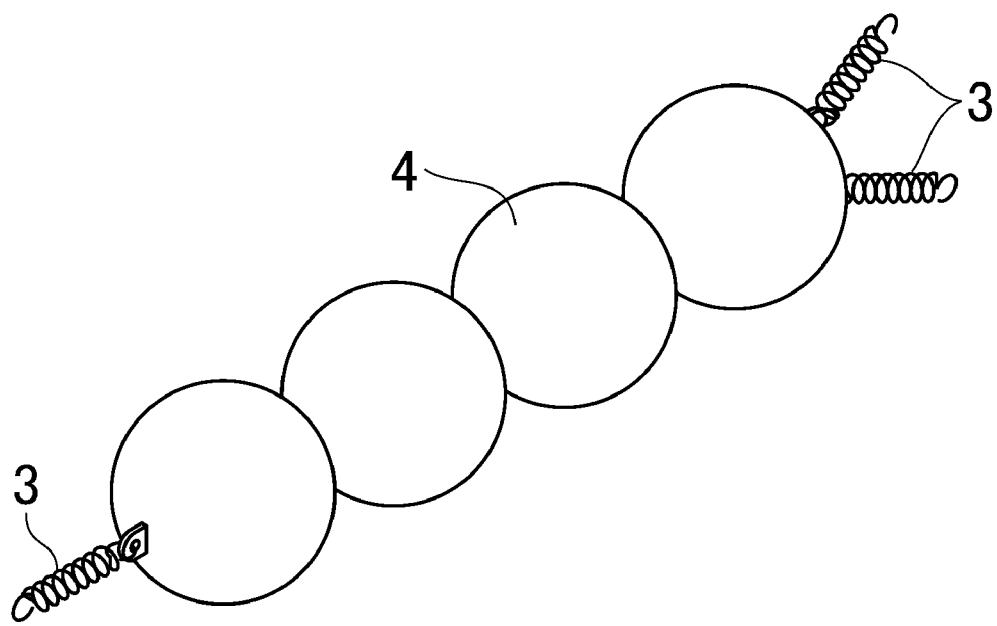

Next, the swing member 4 of the fishing lure 1 will be described with reference to FIG. 7. In the fishing lure 1 according to one example, the swing member 4 (or may be at least a part of the swing member 4) may be formed to be in a cylindrical shape (FIG. 7A), a corrugated shape (FIGS. 7B and 7C), a polygonal shape (including a mode configured by a plurality of polygonal members) (FIGS. 7D and 7E), a polyhedral shape (including a propeller-shaped mode) (FIG. 7F), and a spherical body (FIG. 7G). With this configuration, a lure including a luring mechanism can be provided with which fish eaters can be more reliably lured with a smaller space.

With this configuration, the swing member 4 can rotate about the support member 3. Thus, the swing member 4 has a movable range limited while being prevented from colliding with an inner portion of the main body portion, whereby the cavity can have the smallest possible space. Furthermore, the light received by the swing member 4 from the outside can be reflected to various directions so that the reflected light reliably reaches the fish eater, whereby the luring effect can be dramatically increased.

Figure 8A:
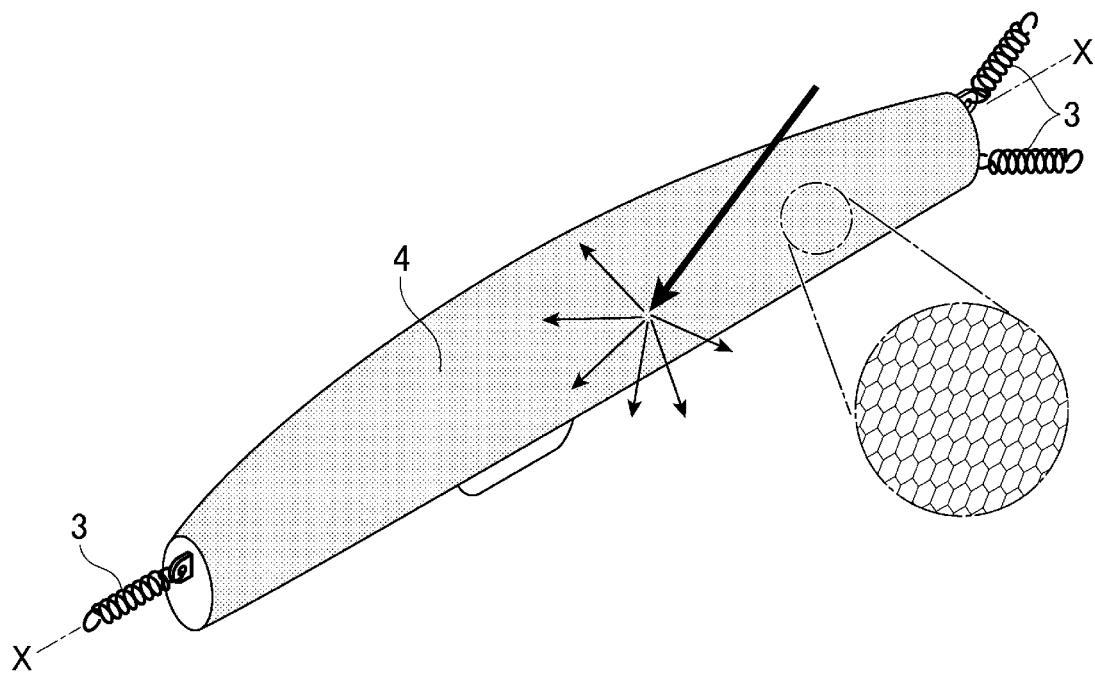
FIGS. 8A to 8C are perspective views of the swing member of a fishing lure according to examples of the present disclosure.

Next, the fishing lure 1 will be described with reference to FIG. 8. FIG. 8A illustrates the fishing lure 1 according to one example in which the swing member 4 has a shape similar to a football shape and is formed to be a polygonal body as a whole. With the swing member 4 thus formed into a polygonal body, the light received by the swing member 4 from the outside can be reflected to various directions so that the reflected light reliably reaches the fish eater, whereby the luring effect can be dramatically increased.

Figure 8B:
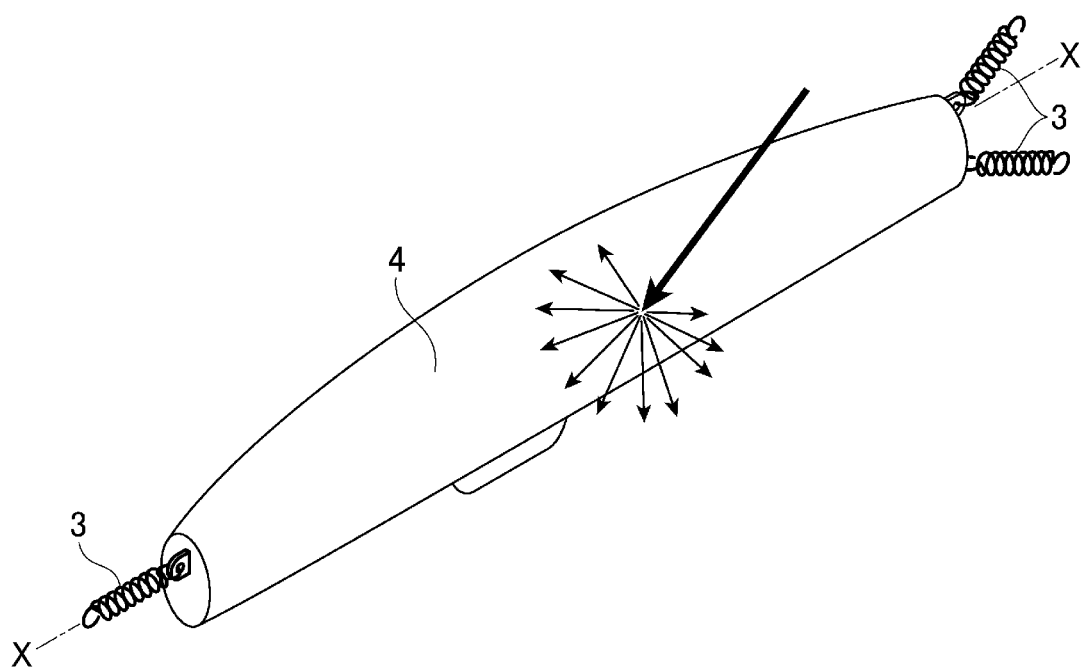

Next, FIG. 8B illustrates the swing member 4, supported by the support member 3, having a substantially football shape and having a hologram attached to its surface. With the hologram attached to the swing member 4, as in the polygonal body in FIG. 8A, the light received by the swing member 4 from the outside can be reflected to various directions so that the reflected light reliably reaches the fish eater, whereby the luring effect can be dramatically increased.

Figure 8C:
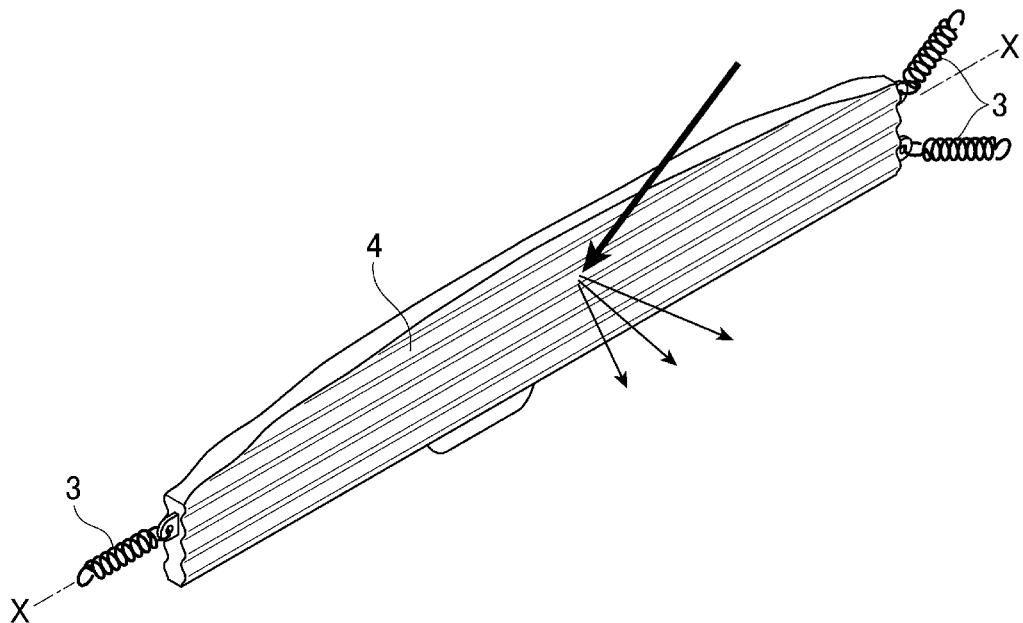

Next, FIG. 8C illustrates the swing member 4, supported by the support member 3, formed to be in a corrugated shape. With the swing member 4 formed to be in the corrugated shape, as in FIGS. 8A and 8B, the light received by the swing member 4 from the outside can be reflected to various directions so that the reflected light reliably reaches the fish eater, whereby the luring effect can be dramatically increased.

The dimensions, material, and arrangement of each component described herein are not limited to those explicitly described in the examples and each of these components can be modified to have any desirable dimensions, material, and arrangement that can fall within the scope of the present invention. Components that are not explicitly described herein may be added to the described examples, and some of the components described in each example may be omitted.

What is claimed is:

1. A fishing lure comprising:
    a main body portion with a cavity provided inside of the main body portion;
    a swing member disposed within the cavity and visible from outside of the main body portion, wherein the swing member is suspended within the cavity of the main body portion by at least three independent elastic members,
    wherein the at least three independent elastic members comprise:
        a first elastic member mounted in a first orientation relative to a longitudinal axis of the main body portion;
        a second elastic member mounted in a second orientation relative to the longitudinal axis of the main body portion; and
        a third elastic member mounted in a third orientation relative to the longitudinal axis of the main body portion, wherein the first, second, and third orientations are different from each other, and
    wherein each of the at least three independent elastic members extends between portions of the swing member and the main body portion such that free rotation of the swing member is prevented by at least one of the at least three independent elastic members.

2. The lure according to claim 1, wherein the swing member is provided with a weight.

3. The lure according to claim 1, wherein the swing member has an end portion provided with a weight.

4. The lure according to claim 1, wherein the first elastic member has a longitudinal direction orthogonal to a longitudinal direction of the second elastic member.

5. The lure according to claim 1, further comprising one or more additional elastic members, wherein the swing member comprises a plurality of swing portions coupled to each other by the one or more additional elastic members, and the swing portions are supported by the main body portion via the at least three independent elastic members and/or the one or more additional elastic members.

6. The lure according to claim 1, wherein the at least three independent elastic members comprise spring members.

7. The lure according to claim 1, wherein the swing member has at least a portion in a V shape as viewed in a cross section orthogonal to an extending direction of the swing member.

8. The lure according to claim 1, wherein the swing member is configured to reflect light from the outside.

9. The lure according to claim 1, wherein the swing member has at least a portion formed in a corrugated shape as viewed in a cross section orthogonal to an extending direction of the swing member.

10. The lure according to claim 1, wherein at least a portion of the swing member is formed to be a corrugated shape.

* * * * *